United States Patent

[11] 3,566,839

| [72] | Inventor | Eugen Hilble<br>Heinrich Otto-Str. 6, 7906 Herrlingen near Ulm, Germany |
|---|---|---|
| [21] | Appl. No. | 846,438 |
| [22] | Filed | July 31, 1969 |
| [45] | Patented | Mar. 2, 1971 |
| [32] | Priority | Aug. 2, 1968 |
| [33] | | Switzerland |
| [31] | | 11605/68 |

[54] FISHPOND SYSTEM
9 Claims, 4 Drawing Figs.

| [52] | U.S. Cl. | 119/3 |
|---|---|---|
| [51] | Int. Cl. | A01k 61/00 |
| [50] | Field of Search | 119/2, 3, 4, 48, 5; 43/100 |

[56] References Cited
UNITED STATES PATENTS

| 2,886,001 | 5/1959 | Kitson | 119/48X |
|---|---|---|---|
| 2,944,513 | 7/1960 | Keely | 119/3 |
| 3,096,600 | 7/1963 | Gwyther | 43/100 |
| 3,119,375 | 1/1964 | Ernst | 119/48 |
| 3,158,135 | 11/1964 | Kimmerle | 119/3 |
| 3,166,043 | 1/1965 | Castillo | 119/3 |
| 3,237,339 | 3/1966 | Rice | 43/44.99 |

*Primary Examiner*—Aldrich F. Medbery
*Attorney*—Otto John Munz

ABSTRACT: A fishpond system for the controlled feeding and sorting of fish which consists of a plurality of ponds of sector-shaped outline arranged in two semicircular clusters around two spaced retrieval pits located on opposite sides of a fish-sorting cabin. The two retrieval pits accommodate retrieval baskets which, after being loaded with water and fish, are transferred to the sorting cabin by means of a hoist and cableway.

INVENTOR
Eugen HILBLE

FISHPOND SYSTEM

BACKGROUND OF THE INVENTION

1. Field of the Invention

The invention relates to a fishpond system for the controlled feeding and sorting of fish which includes a plurality of ponds and means to transfer the fish to and from a fish-sorting station.

2. Description of the Prior Art

Conventional fishponds have a more or less elongated rectangular outline, and are equipped with a water supply connected to one of their short sides and a water drain on the other short side. In most cases the pond bottom slopes toward the water drain to facilitate draining and cleaning of the pond. Depending on the characteristics of the terrain, the ponds may be arranged side-by-side or in tandem. Furthermore, it is possible to use flow channels of natural contour or channels built of concrete, where the fish, especially trout, can be kept in fast-flowing water.

For reasons of efficient production, it is frequently necessary to remove the fish from the individual ponds, to sort them into groups of different size, and then to redistribute them to the different ponds in accordance with their size. This makes it possible to have fish of practically identical size in each of the ponds and to avoid that the bigger fish push the smaller fish away from the feeding stations, thereby retarding their growth. Obviously, therefore, the production of fish is accelerated and rendered more economical the more often the fish are sorted and the closer the optimal growth conditions are thereby approached. A limitation to these efforts is found in the requirements of personnel and time which are needed to retrieve and sort the fish and to redistribute them into the ponds. The economy of operation of such a fishpond system can therefore be increased by reducing the requirements of personnel and time.

A known method of catching the fish consists in pulling a net through the pond, thereby crowding the fish into a corner of the pond, and then to remove them by means of a dip net. In order to avoid the use of nets, it is known to arrange a retrieval pit adjacent to the outlet side of the pond, and to gather the fish in it, after most of the water has been drained from the pond. The fish are then removed from the retrieval pit by means of a dip net, and it involves considerable physical effort to lift the not inconsiderable load of fish from the pond or from the retrieval pit into the containers in which the fish are transferred.

The sorting of the fish is commonly done at the place of retrieval. The fish are transferred from the dip net onto a hand-operated sorting frame which has a bottom consisting of a bar grader with adjustable clearances between the bars. Prior to the sorting operation the bar grader is adjusted for a small clearance and during the sorting operation the clearance is progressively increased to predetermined widths. The fish which pass through this bar grader by progressively increasing size categories are separated into portable water containers and subsequently returned to the ponds corresponding to their size categories.

Sorting of the fish by means of hand-operated sorting frames represents a complicated operation, and it is known to replace it by automatically operating sorting equipment arranged inside a stationary sorting cabin. In this case, however, the fish have to be transported to the sorting cabin, and from the sorting cabin they have to be returned to the ponds. In such an automatically operating sorting frame the fish glide over a grader where the clearance between the grade bars increases progressively with increased distance from the loading side. The space underneath the grader is subdivided into separate sections by means of partition walls, and in each section is arranged a transport container for the sorted fish. This method permits a reduction of the sorting work itself, but it requires a relatively long transport of the fish between the retrieval pits and the sorting cabin.

In special cases, where the terrain gradient is suitable, it has also been known to arrange the sorting frame above and in the vicinity of the ponds, and to connect it to them over chutes or downward-sloping tubes through which the fish are directly returned to the ponds. However, the proposal has had little influence on the development of fishpond systems toward the objective of making the retrieval, sorting, and redistribution of the sorted fish to the ponds an automatic operation. Underlying this invention is the need to develop such a fishpond system for the purpose of reducing the requirements of personnel and expenses.

SUMMARY OF THE INVENTION

The invention pertains to a fishpond system which comprises a retrieval pit underneath the pond outlets and a retrieval basket which is introduced into the pit and which can be lifted from the retrieval pit and transferred to the sorting cabin by means of a transfer device.

In the fishpond system of the invention the fish are first gathered together by draining the major part of the water of the respective pond, so that the fish pass through the pond outlet into the retrieval basket which is positioned inside the retrieval pit. The retrieval basket, filled with water and fish, is then lifted from the pit and transferred to the sorting cabin. The operation is fully automatic, and the only need for operating personnel is for opening and closing the gate valves for the pond drain and for the pond outlet above the retrieval pit and retrieval basket.

The retrieval basket may be equipped with an overflow screen which is positioned above the drain of the retrieval pit. This arrangement allows the water to flow from the edge of the fish container of the retrieval basket, while retaining the fish. Enough water remains in the fish container, so that the fish can be transferred under water to the sorting cabin.

The structure and arrangement of the retrieval pit and of the retrieval basket can take different forms. With the several ponds arranged side-by-side it is possible to provide the retrieval pit in the form of a ditch alongside the short sides of the ponds, and to place a separate retrieval basket for each pond into the retrieval pit. Considering the cost of installation of this type of system, it is preferable to arrange a plurality of fishponds around a common retrieval pit and to provide a common retrieval basket for the ponds. It has proved to be particularly advantageous to give the individual fishponds a sector-shaped outline and to arrange them in a radial cluster around the retrieval pit. The bottom of the ponds should slope toward the narrow side of the sectors. The circular retrieval pit adjoins the various narrow sector ends. This arrangement permits not only a reduction in the overall space requirements of the ponds, but it also gives a particularly advantageous outline to the individual ponds.

When the fishponds are arranged in the form of a semicircular cluster, it is possible to position the sorting cabin near the retrieval pit, and to connect it to the ponds by chutes or downward-sloping tubes. The fish are then brought to the sorting cabin by means of a transfer device, and the sorted fish are returned to the ponds via these chutes or tubes in the shortest and quickest way. In its most simple version, it is sufficient to arrange at least one chute or downward-sloping tube between the sorting cabin and the ponds, whereby its discharge end in made horizontally movable from one pond to the other. Following the sorting operation, the fish of the various size categories are redistributed to the corresponding ponds by moving the discharge end of the chute or tube successively from one pond to the other.

The radial arrangement of the ponds around the retrieval pit makes it possible to build the sector-shaped fishponds from prefabricated concrete elements. The ponds have a common concrete bottom, and the sidewalls for the exterior and interior periphery are designed as prefabricated concrete elements, the partition walls being installed and fastened between them.

The sector-shaped ponds may be provided with a water-supply trench along their outer periphery and an outlet with a gate valve for each pond on their inner periphery, as well as a screen-covered water drain in the pond bottom near the narrow end of the pond. The screen covering the water drain may be arranged horizontally, so that the fish which crowd above the screen in front of the outlet leading to the retrieval pit tend to clean it, as is commonly the case only in so-called breeding tanks which, in comparison with the conventional fishponds, are of much smaller size and normally made of plastic material. The pond drain can take the form of a syphon and reach up to the water level. Removal of the water from the bottom of the pond has the effect of removing primarily the cold and soiled water.

The radial arrangement of the individual tanks yields additional advantages from the standpoint of production. It makes it possible to feed the fish from the outer periphery of the ponds, so that the fish, while moving toward the feeding place, have to swim against the water current. Sick fish thereby remain in the narrow rear portion of the pond where the water flows faster because of the tapering of the pond cross section. In this manner the danger of sick fish infecting the healthy fish is considerably reduced. The feeding of the fish can be accomplished by means of air-pressure-operated feeding devices. The supply pipe for compressed air is arranged at the outer periphery of the ponds in such a way that only a single compressor is required for the entire pond system.

For the purpose of linking the greatest number of fishponds to a sorting cabin it is advantageous to arrange the sector-shaped fishponds in two semicircular clusters around two retrieval pits, with retrieval baskets located on opposite sides of the sorting cabin. For each retrieval basket is provided a transfer device to move it between the retrieval pit and the sorting cabin.

The basket transfer device itself can take the form of a variety of devices, inasmuch as it requires only a lifting device to raise the retrieval basket from the retrieval pit and a conveying device to transfer the loaded retrieval basket to the sorting cabin. In its most simple version the transfer device may consist of a cableway and a hoist, for example.

The advantages obtained from the invention consist primarily in a lowering of the operating expenses of the fishpond system, in that the requirements in operating personnel are reduced. In fact, the invention permits the elimination of at least two operators for a system of conventional size, with a yearly production capacity of 40,000 kgs. of fish. In addition, the production quality of fish is improved for the above-mentioned reasons. Furthermore, the fish are handled with more care during their transfer to and from the sorting cabin, as compared to the alternative where they are scooped up with a dip net and frequently kept tightly squeezed in relatively small transport containers for extended periods of time. Lastly, it should not be overlooked that fish are known to move toward any person who appears at the pond, in the expectation of food, even outside of feeding time, thereby spending a certain amount of energy which is detrimental to their rapid growth. It is therefore advisable that the fish be disturbed as little as possible by personnel working around the fishponds. This objective is particularly well met by the invention, because the reduction in operating personnel also greatly reduces the movement around the ponds and resulting possible disturbances of the fish.

In the following, the invention is explained in more detail by means of the drawings illustrating a preferred embodiment.

DESCRIPTION OF THE PREFERRED EMBODIMENT

Figure 1:
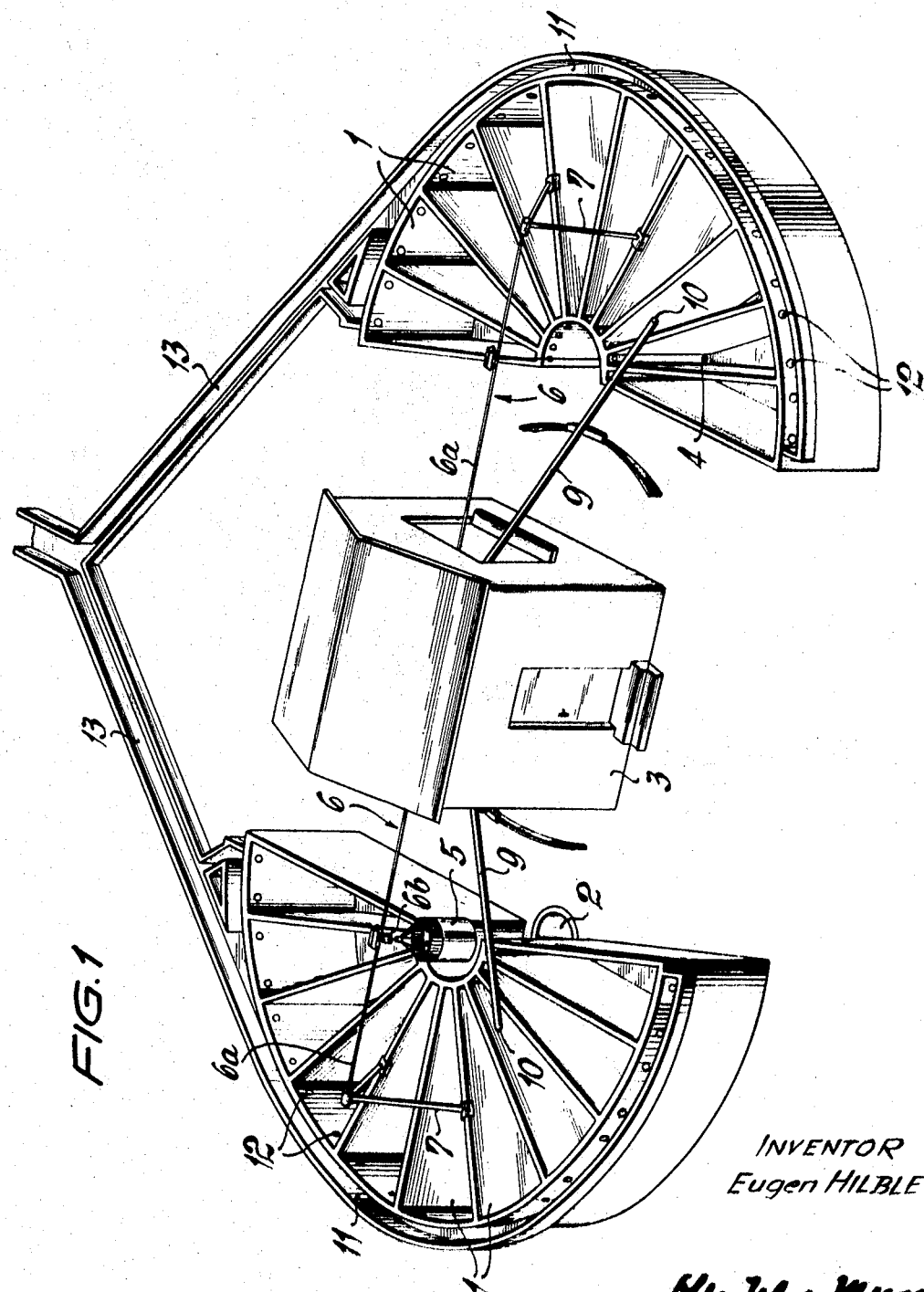
FIG. 1 is a perspective view of a fishpond system according to the invention.

The FIGS. show a fishpond system consisting of a plurality of ponds 1 arranged in clusters around two spaced retrieval pits 2, and a sorting cabin 3 located between them. Inside the retrieval pit 2, and below the pond outlet 4, is placed a retrieval basket 5. This retrieval basket 5 can be lifted from the retrieval pit 2 and transferred to the sorting cabin 3 by means of a transfer device 6. In the embodiment shown, the transfer device 6 consists of a cableway 6a supported between the sorting cabin 3 and a cable support 7 located on the opposite side of the retrieval pit 2. A hoist 6b is provided for the purpose of lifting the retrieval basket 5 from the retrieval pit 2. The hoist may be operated manually, or preferably by means of an electric motor, not shown in the drawing. The cableway 6a may have a separate load cable and traction cable, or it may have a single moving cable.

The retrieval basket 5 includes a fish container 5a and a overflow screen 5b, the overflow screen 5b being located above the pit drain 8 of the retrieval pit 2. This allows the excess water to flow from the retrieval basket 5, but prevents the fish from jumping over the edge of the fish container 5a, while leaving enough water in the fish container for the transportation of the fish to the sorting cabin 3. In the case of an inadequate terrain gradient, it is of course also possible to provide a pump inside the retrieval pit for the removal of the water.

Figure 3:
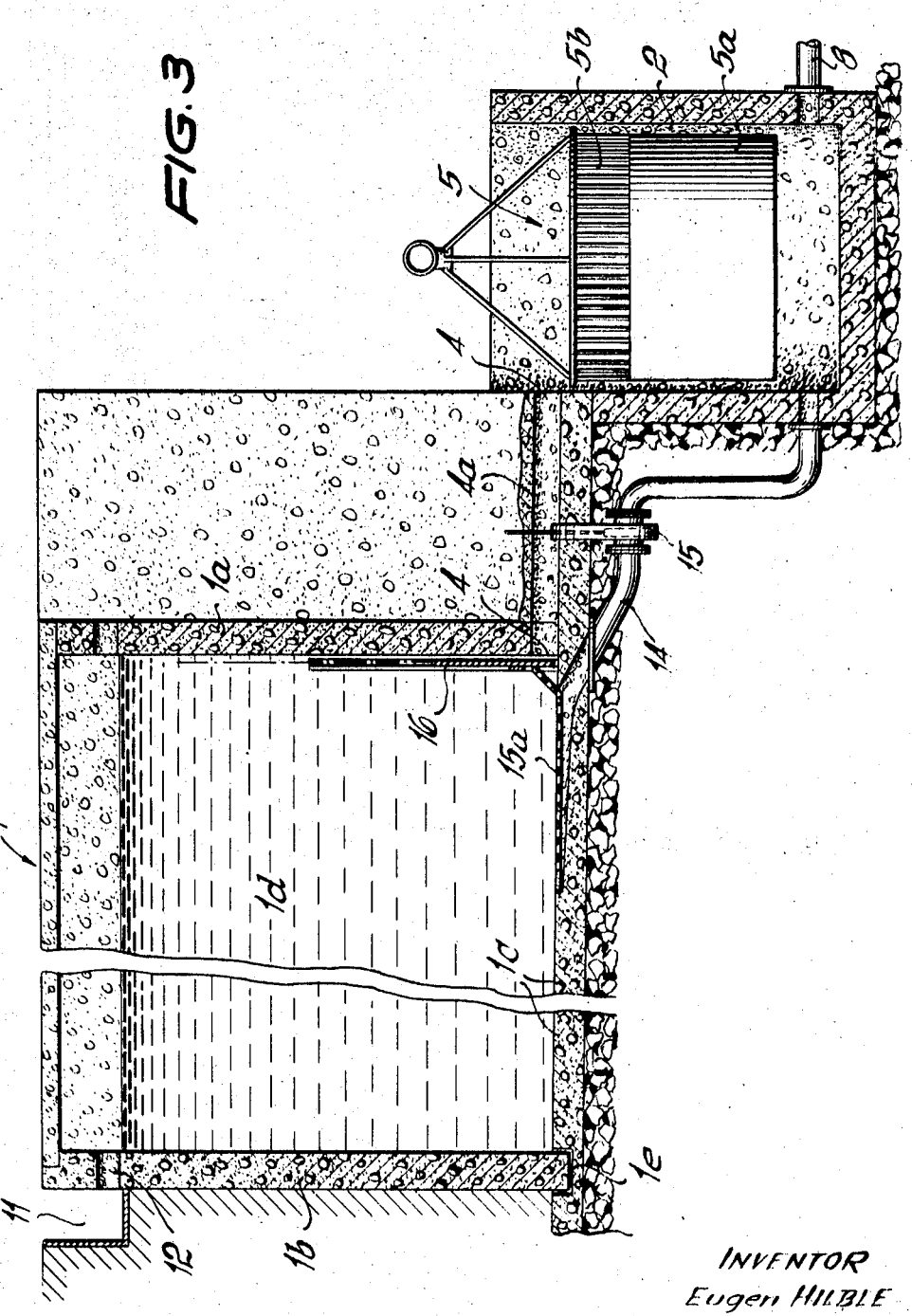
FIG. 3 is a cross-sectional elevation taken along the line III–III of FIG. 2 and showing details of a pond and retrieval pit.

The fishponds of the embodiment shown are arranged in clusters around the retrieval pit 2. The fishponds 1 have the outline of a circular sector and their bottom 1c slopes toward the narrow end 1a of the sector, as can be seen in FIG. 3. The arrangement is such that the sector-shaped ponds 1 surround the retrieval pit 2 in the shape of semicircular clusters. This makes it possible to arrange the sorting cabin 3 in the vicinity of the retrieval pits 2 and to link it to the individual ponds 1 by means of chutes or downward-sloping tubes 9. For this purpose it is sufficient to provide at least one chute or downward-sloping tube 9 between the sorting cabin 3 and the retrieval pit 2 with its associated pond-cluster, and to make its discharge end 10 horizontally movable between the individual ponds 1.

Figure 4:
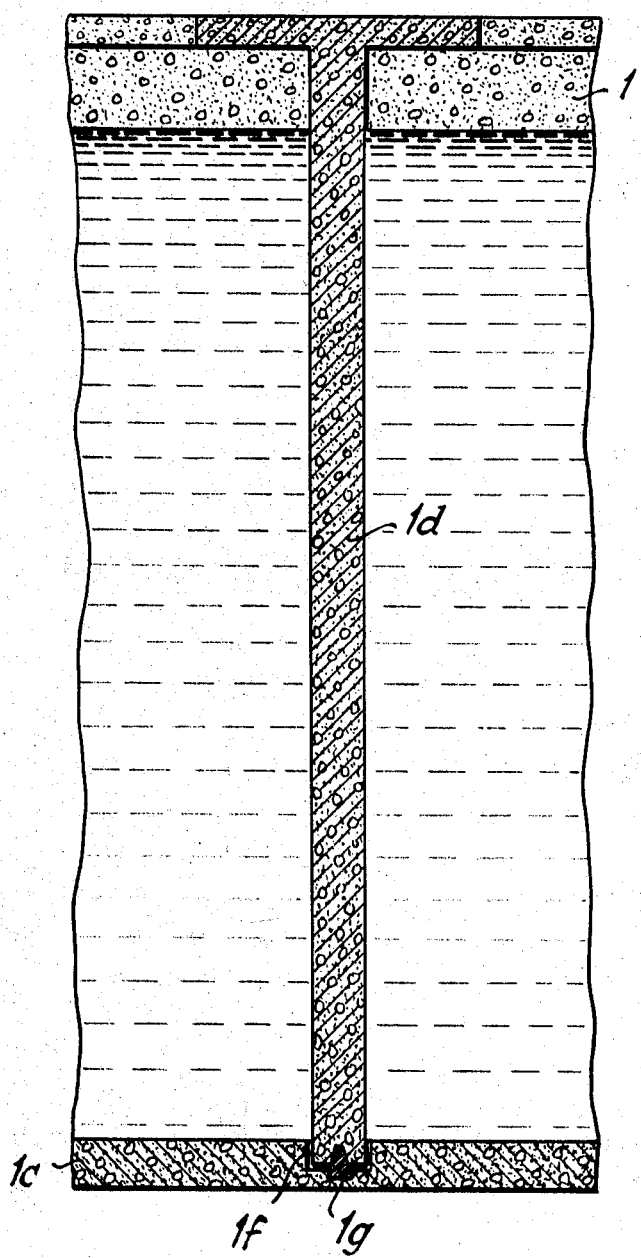
FIG. 4 shows an enlarged cross-sectional detail of the embodiment, in the cross section taken along line IV–IV of FIG. 2.

From FIGS. 3 and 4 it can be seen that the sector-shaped ponds 1 are built from prefabricated concrete elements. For this purpose it is only necessary to produce a common pond bottom 1c of cast concrete and to install the prefabricated concrete elements forming the outer periphery 1b b and the inner periphery 1a as well as the partition walls 1d of the ponds 1. These elements may be positioned inside grooves 1e and 1f, as shown in FIG. 3 and FIG. 4 respectively. Inside these grooves are provided sealing strips 1g. The sector-shaped fishponds 1 are surrounded along their outer periphery 1b by a water supply trench 11 having water inlets 12 which are connected to a fresh water supply by means of the side trenches 13. A continuous removal of water is obtained either by an overflow, or preferably by arranging a drain channel 14 which, while serving as a water drain, also controls the water level in the pond, either by means of a syphon (not shown) which extends up to the water level, or by means of an adjustable gate valve 15. This drain channel 14 is located in the vicinity of the inner periphery 1a and is covered by a substantially horizontal screen 15a. This screen is kept clean by the fish crowding above it and in front of the pond outlet 4, when the pond is drained. The pond outlet 4 is also located at the inner periphery 1a of the sector-shaped pond, and it is normally kept closed by means of a gate valve 16. When the major portion of the water is drained through the drain channel 14, the fish gather in front of the pond outlet 4, and when the gate valve 16 is opened they pass through the passage 4a into the retrieval basket 5 located in the retrieval pit 2. The retrieval basket 5 is then lifted from the retrieval pit 2 by means of the transfer device 6 and moved to the sorting cabin 3.

Figure 2:
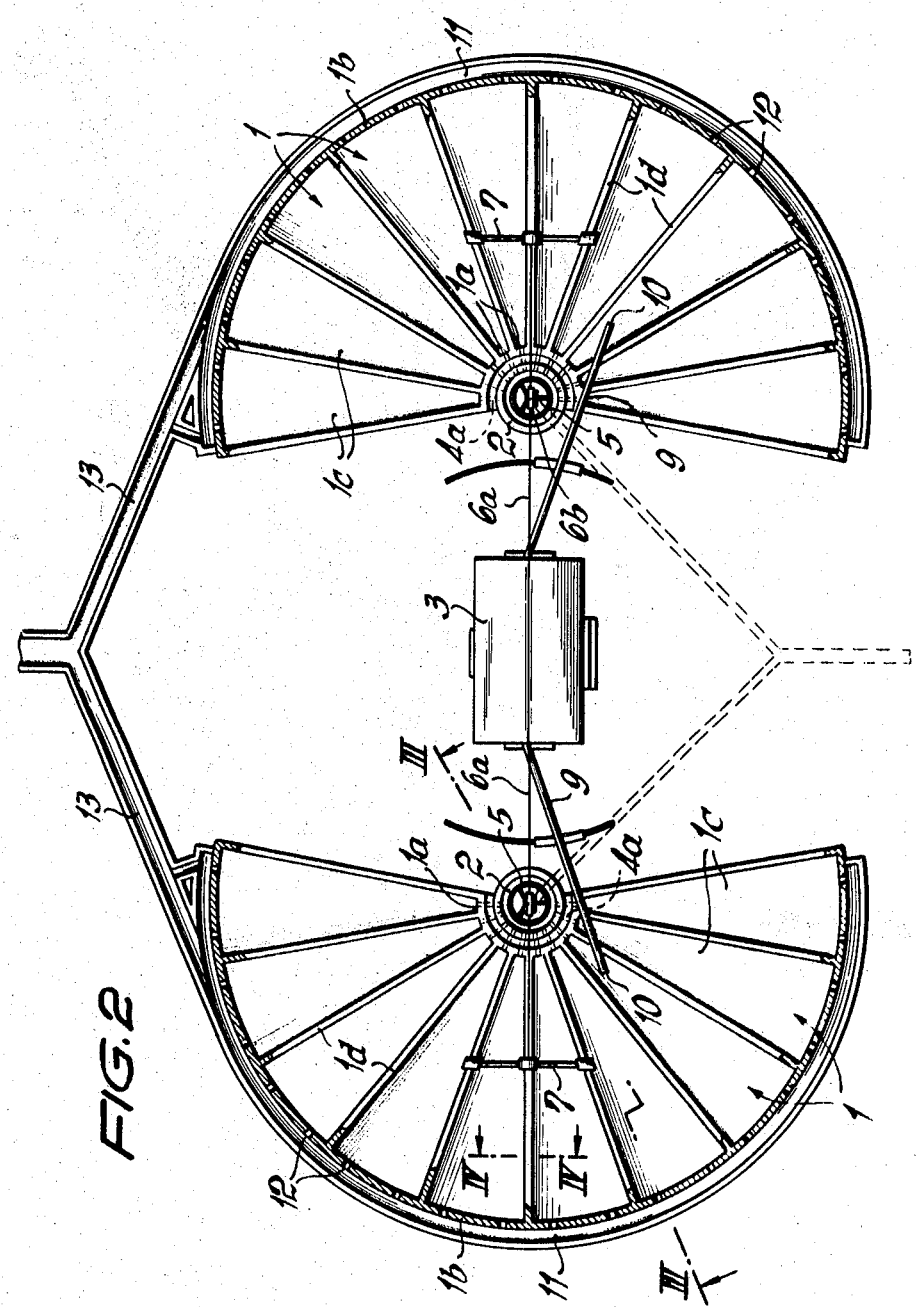
FIG. 2 is a plan view of the fishpond system of FIG. 1.

As is illustrated in FIGS. 1 and 2, the sector-shaped fishponds 1 are arranged in two semicircular clusters around two spaced retrieval pits. It is sufficient to provide a retrieval basket for each retrieval pit and to arrange the sorting cabin between the two retrieval pits. This makes it possible to link the largest possible number of fishponds to a single sorting cabin.

I claim:

1. A fishpond system for the controlled feeding and sorting of fish, comprising in combination:
   a. a plurality of ponds having each a geometric outline with a water supply side and an outlet side;
   b. pond outlet means on said outlet side of at least one of said ponds for the removal of fish and water from said pond;
   c. retrieval means adjacent said outlet side to hold fish and water when they are removed from said ponds through said pond outlet means;
   d. a retrieval basket as part of said retrieval means, said retrieval basket having a retrieval position adjacent a lower portion of said ponds for communicating with said pond outlet means so that, when fish and water are removed from said ponds through said pond outlet means, they pass into said retrieval basket;
   e. transfer means to move said retrieval baskets from said above said ponds and then to a fish-sorting means;
   f. said fish-sorting means stationed in the vicinity of said ponds and said discharge position to sort the fish into predetermined categories; and
   g. said fish-sorting means including fish chute means linking said fish-sorting means to selected ones of said ponds to permit returning of the fish to said ponds.

2. A fishpond system as claimed in claim 1, said retrieval basket including a fish container with an opening through which to receive fish and water, said retrieval basket further including overflow means so arranged that excess water is permitted to flow from fish container, while the fish are retained therein.

3. A fishpond system as claimed in claim 1, said retrieval means further including a retrieval pit arranged adjacent to the outlet side of at least one of said ponds, said retrieval pit being shaped to accommodate said retrieval basket in a retrieval position below said pond outlet means.

4. A fishpond system as claimed in claim 3, said means to transfer including lifting means to lift said retrieval basket out of said retrieval pit, and translation means to move said retrieval basket from said retrieval pit to said fish-sorting means.

5. A fishpond system as claimed in claim 1, said fish chute means including a discharge end which is displaceable, thereby selectively linking said fish-sorting means to different ponds.

6. A fishpond system as claimed in claim 2, said plurality of ponds being arranged in a cluster around said retrieval pit.

7. A fishpond system as claimed in claim 6, said geometric outline of said ponds having the shape or a circular sector, said ponds being arranged in a radial cluster around a cluster center, and said retrieval pit being of a circular shape and located substantially on said cluster center, so that said outlet sides of said ponds are spaced around the periphery of said retrieval pit.

8. A fishpond system as claimed in claim 7, said ponds being arranged in two semicircular clusters around two spaced circular retrieval pits, said semicircular clusters facing one another; said fish-sorting means further including a sorting cabin located between said retrieval pits.

9. A fishpond system as claimed in claim 7, said ponds including a concrete pond bottom sloping toward said retrieval pit, vertical partition walls of prefabricated concrete forming a common sidewall of two adjacent ponds, an outer vertical wall of prefabricated concrete forming the outer periphery of said cluster and the supply side of said ponds, and an inner vertical wall of prefabricated concrete forming the outlet side of said ponds; said pond outlet means including a separate outlet for each pond and a corresponding gate valve to open and close said outlet; each of said ponds further including a pond drain with a drain gate valve and means to control the water level inside the pond.